No. 765,448. PATENTED JULY 19, 1904.
J. WALSH.
CULTIVATOR CLEANER.
APPLICATION FILED OCT. 27, 1903.
NO MODEL. 2 SHEETS—SHEET 1.

Witnesses
Inventor
John Walsh
By
Attorneys

No. 765,448. PATENTED JULY 19, 1904.
J. WALSH.
CULTIVATOR CLEANER.
APPLICATION FILED OCT. 27, 1903.
NO MODEL. 2 SHEETS—SHEET 2.
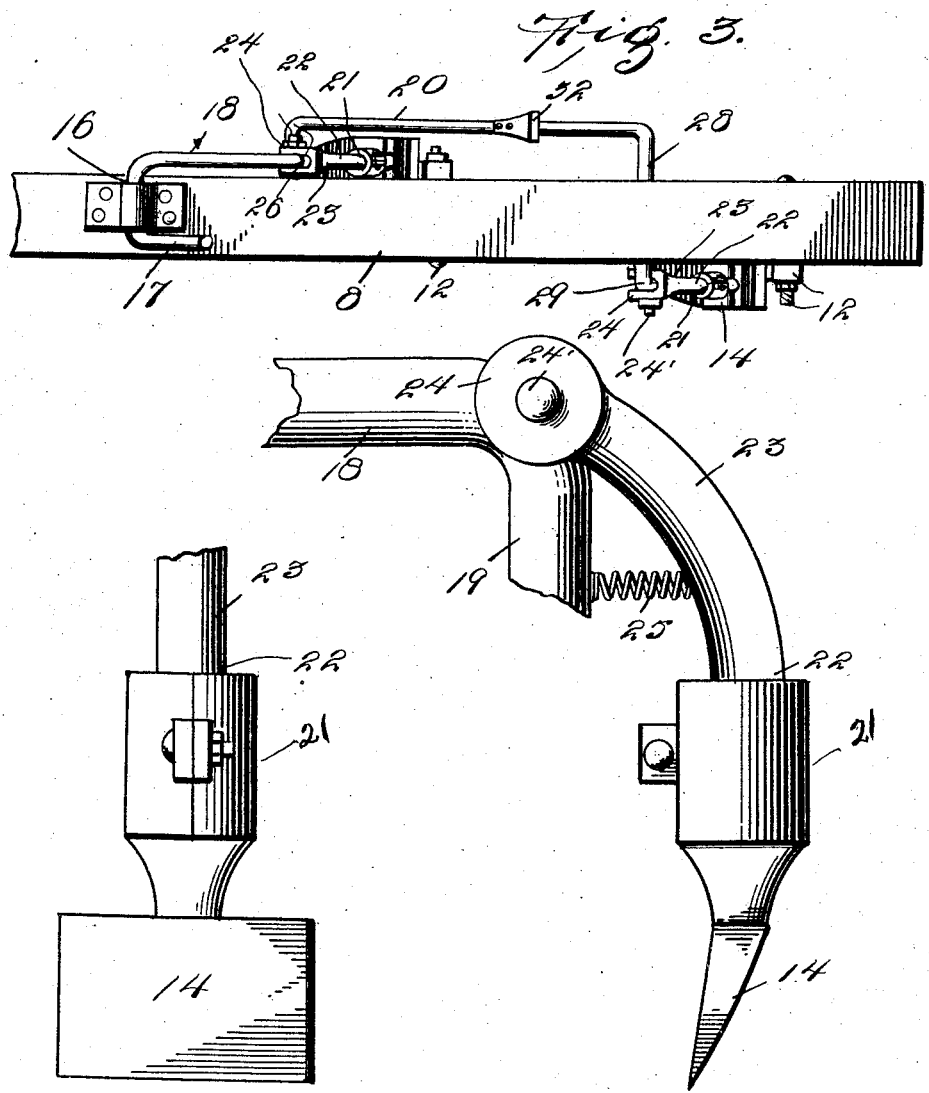

No. 765,448. Patented July 19, 1904.

UNITED STATES PATENT OFFICE.

JOHN WALSH, OF NORTHFIELD, MINNESOTA, ASSIGNOR OF ONE-HALF TO JOSEPH H. DAUNT, OF MINNEAPOLIS, MINNESOTA.

CULTIVATOR-CLEANER.

SPECIFICATION forming part of Letters Patent No. 765,448, dated July 19, 1904.

Application filed October 27, 1903. Serial No. 178,713. (No model.)

*To all whom it may concern:*

Be it known that I, JOHN WALSH, a citizen of the United States, residing at Northfield, in the county of Rice, State of Minnesota, have invented certain new and useful Improvements in Cultivator-Cleaners; and I do hereby declare the following to be a full, clear, and exact description of the invention, such as will enable others skilled in the art to which it appertains to make and use the same.

This invention relates to cultivators wherein the shovels are adjustable into and out of engagement with the ground, and more particularly to means for cleaning the shovels, the object of the invention being to provide a construction wherein by pressure of the foot of the operators scrapers will be caused to travel down the faces of the shovels and the shovels will be at the same time raised from the ground, so that the dirt will be scraped from them.

Figure 1:
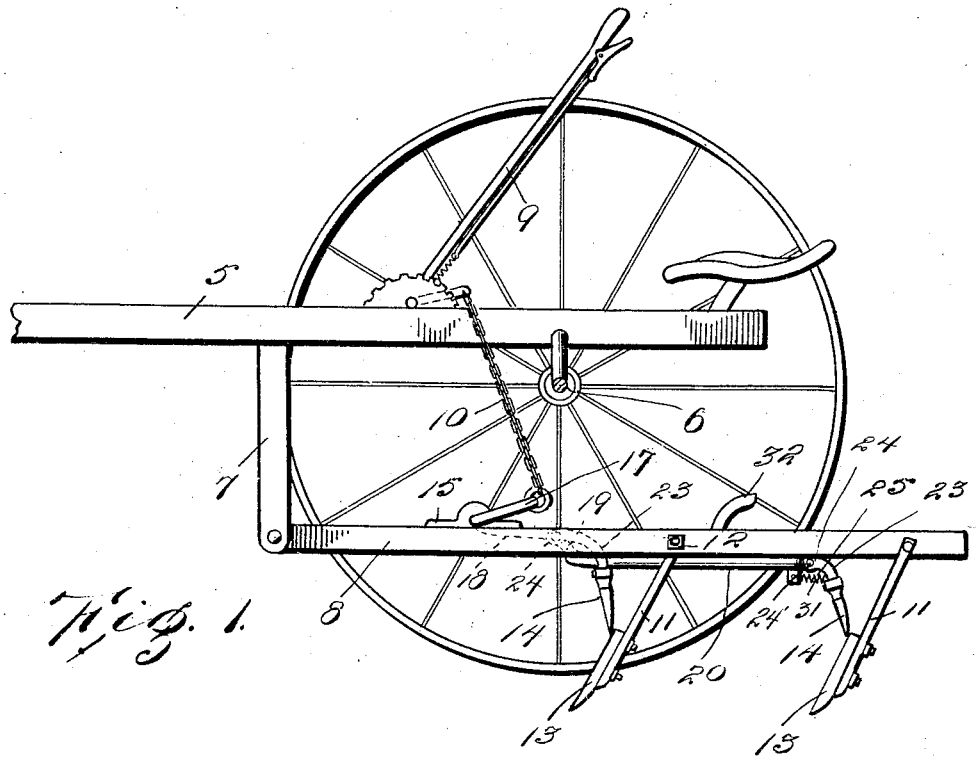
Figure 2:
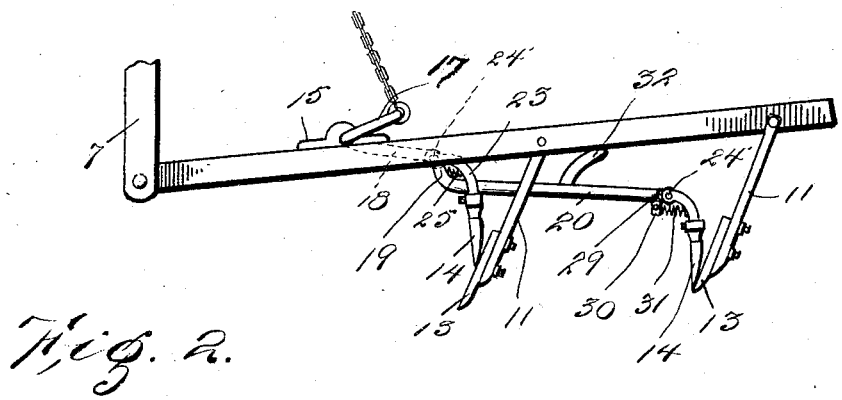

In the drawings, forming a portion of this specification, and in which like numerals of reference indicate similar parts in the several views, Figure 1 is a side elevation showing a cultivator with one of its wheels removed and embodying the present invention, the scrapers being in raised positions. Fig. 2 is a side elevation showing one of the cultivator-beams with its scrapers in lowered positions. Fig. 3 is a top plan view of a beam equipped with the scrapers. Fig. 4 is a detail view of the scrapers for one of the beams. Fig. 5 is an elevation showing the manner of mounting the scrapers.

Referring now to the drawings, there is shown a cultivator comprising a frame 5, having an axle 6 to receive wheels for supporting the frame, and at the front of the frame are hangers 7, that depend therefrom, and at the lower ends of which are pivoted cultivator-beams 8, which are adapted to be raised and lowered by means of levers 9 and chains 10, connected to the levers and with the beam as hereinafter described.

Connected to the beam 8 are the standards 11 through the medium of bolts 12, which are engaged transversely through the beam in the usual manner, each standard having bolted thereto a cultivator-shovel 13, this portion of the cultivator being of the ordinary construction.

Each cultivator-beam is provided with a scraper-blade 14 for each of the shovels, the blades being mounted as follows: Upon the beam 8 is mounted a pillow-block 15, in which is mounted a bell-crank lever comprising the rock-shaft 16 and upwardly and rearwardly directed arm 17 and a rearwardly-directed arm 18, the arm 17 having the chain 10 connected thereto, the arm 18 extending rearwardly at the side of the beam to a point in advance of the forward cultivator-shovel, where it extends downwardly, as shown at 19, and then rearwardly, as shown at 20, the portion 20 being parallel with the portion 18.

Each scraper-blade 14 has a socket 21 at its upper end, in which is received the lower cylindrical end 22 of a hanger 23, having its upper end bifurcated at the head 24. The bifurcating-slot of the head 24 of one hanger is disposed to receive the rear end of the forward portion of the arm 18 at the upper end of the portion 19, the parts being connected by the transverse pivot-bolt 24', which permits of movement of the hanger to raise and lower the scraper-blade. The hanger 23 is curved or of arc shape, and its pivot is so positioned that when moved pivotally the scraper will move in a path of different curvature to the cultivator-shovel, and between the hanger 23 and the portion 19 is disposed a helical spring 25, which serves to hold the scraper-blade yieldably against forward pivotal movement. As the mechanism is mounted upon the harrow-beam, the hanger 23 is directly in front of the forward standard 11, with the scraper-blade held by the spring 25 yieldably against the upper end of the forward cultivator-shovel. If the arm 18 be then swung downwardly, the rock-shaft 16 will rotate in the pillow-block and the scraper-blade carried by the hanger 23 will move downwardly of the front face of the cultivator-shovel and scrape the dirt therefrom, the blade being held snugly against the front of the shovel by means of the helical springs 25, so that it will positively enter beneath the dirt. From the portion 20 the arm 18 extends inwardly beneath the beam, as shown at 28, and then rearwardly, as shown at 29, this portion 29 lying in front of the rear cultivator-shovel and entering the bifurcated head 24 of a second hanger 23 for a second scraper-blade 14. From the portion 29 depends a lug 30, between which and the hanger 23 is disposed a helical spring 31, which serves to hold the hanger with the scraper-blade yieldably against the rear cultivator-shovel, so that when the carrying-arm is depressed the rear scraper-blade will be held in close contact with the rear cultivator-shovel. The portion 20 of the carrier is provided with a foot-piece 32.

With this construction it will be seen that if the foot-piece be pressed downwardly the carrier will be correspondingly moved and the scraper-blades caused to travel over the faces of the cultivator-shovel. As the rock-shaft 16 is in advance of the point of connection of the arm 17 with the chain 10, the point of connection of the chain and arm acts as a fulcrum, so that the beam 8 will be raised on its pivotal connection with the cultivatro-frame, and the shovels will be thus raised from the ground to facilitate the cleaning operation. Inasmuch as the portion 28 of the carrying-arm lies transversely beneath the cultivator-beam the cultivator-beam is raised when the chain 10 is drawn by the connected lever.

What is claimed is—

1. In a cultivator, the combination with a frame, hangers supported from the frame, and a beam pivoted to each of the said hangers, the said beam being provided with cultivator-shovels, of a carrying-arm mounted upon the beam at a distance from point of support of the said beam, scrapers carried by the carrying-arm and movable therewith along the shovels and means connected with the carrying-arm for raising the beam when the carrying-arm is moved to actuate the scrapers.

2. In a cultivator, the combination with a frame, hangers supported from the frame, and a beam provided with shovels and pivoted to each of the said hangers, of a bell-crank lever mounted upon the beam, scrapers attached to one arm of the lever in position for movement over the cultivator-shovels, a beam-raising lever mounted upon the frame, a connection between the beam-raising lever and the second arm of the bell-crank lever arranged for upward movement of the beam, when the scraper-carrying arm of the bell-crank lever is depressed, and a foot-piece mounted upon the last-mentioned arm of the said bell-crank lever.

3. In a cultivator, the combination with a pivoted beam provided with cultivator-shovels, of a foot-operated arm pivoted upon the beam, scrapers carried by the arm and movable therewith along the shovels and means connected with a portion of the arm for holding it against downward movement whereby when said arm is moved pivotally the beam with its shovels will be raised.

4. In a cultivator, the combination with a pivoted beam provided with cultivator-shovels, of a carrying-arm pivoted to the beam and provided with scrapers movable therewith along the shovels, said arm having a crank projecting through its pivoted portion, and means connected between the crank and the frame of the cultivator for holding said crank against downward movement whereby the beam will be raised when the arm is depressed.

In testimony whereof I affix my signature in presence of two witnesses.

JOHN WALSH.

Witnesses:
  J. F. WYMAN,
  W. W. SHELDON.